United States Patent
Meli

(10) Patent No.: US 7,359,634 B1
(45) Date of Patent: Apr. 15, 2008

(54) LIGHT COLOR RECOGNITION FOR OPTICAL CONNECTION VERIFICATION

(75) Inventor: Fausto Meli, Piacenza (IT)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 10/632,993

(22) Filed: Aug. 1, 2003

(51) Int. Cl.
*H04B 10/12* (2006.01)

(52) U.S. Cl. .................. 398/28; 398/151; 356/73.1

(58) Field of Classification Search .............. 356/73.1; 398/10, 25, 31, 151, 28
See application file for complete search history.

(56) References Cited

U.S. PATENT DOCUMENTS

| | | | |
|---|---|---|---|
| 6,094,261 A * | 7/2000 | Contarino, Jr. ............ 356/73.1 |
| 6,375,362 B1 | 4/2002 | Heiles et al. ................. 385/75 |
| 6,574,016 B1 | 6/2003 | Harley et al. ............... 359/124 |
| 6,590,659 B2 * | 7/2003 | Melnyk et al. ............. 356/406 |
| 6,888,996 B2 * | 5/2005 | Hwang et al. .............. 385/139 |
| 6,920,287 B1 * | 7/2005 | Hinds et al. ................... 398/9 |
| 2003/0059171 A1 | 3/2003 | Pfleger ........................ 385/75 |

* cited by examiner

*Primary Examiner*—Leslie Pascal
(74) *Attorney, Agent, or Firm*—Aka Chan LLP

(57) ABSTRACT

Optical connection verification schemes that do not cause electromagnetic interference. An all-optical connection verification scheme exploits optical coding based on a standard color scale such as RGB (red, green, blue). An RGB LED source is used to launch a three-color optical signal where the relative (or absolute) magnitudes of the color components identify the connection. On the receiver end, an RGB photodiode measures the relative (or absolute) magnitudes of the color components to verify the connection. Alternatively, one end of the connection may transmit white light with the other end reflecting back a similar three-color signal by use of a color-coded panel reflector.

25 Claims, 6 Drawing Sheets

LIGHT COLOR RECOGNITION FOR OPTICAL CONNECTION VERIFICATION

BACKGROUND OF THE INVENTION

The present invention relates to optical communication systems and more particularly to interconnections among optical communication equipment.

A site in a service provider optical network such a metro or core DWDM network will typically have a variety of optical modules including, e.g. transmitter modules, receiver modules, multiplexer modules, demultiplexer modules, amplifier modules, etc. These modules are interconnected by optical patch cords. There is thus often a confusing jumble of such interconnections. Installation of equipment and provisioning of new services required disconnecting and/or connecting one or more optical patch cords. Due to human error, optical misconnections can be quite frequent leading to loss of existing service and delays in provisioning new services.

A known method of verifying optical connections is to embed electrical wiring in each optical patch cord and then use the electrical wiring to transmit a coded signal that verifies the proper connection. One of the connection modules transmits a coded signal that identifies that device or the connection. At the other end of the connection, the other device detects this code to verify that the correct connection has been made.

This approach, however, carries drawbacks. The electrical patch cord effectively acts as an antenna, radiating electromagnetic interference (EMI) into electronic boards on either side of the link. The use of isolators as EMI shields is only a partial solution to this problem and comes at greatly increased cost.

What is needed are systems and methods for verifying optical connections without introducing electromagnetic interference.

SUMMARY OF THE INVENTION

Embodiments of the present invention provide optical connection verification without causing electromagnetic interference. An all-optical connection verification scheme exploits optical coding based on a standard color scale such as RGB (red, green, blue). An RGB LED source is used to launch a three-color optical signal where the relative (or absolute) magnitudes of the color components identify the connection. On the receiver end, an RGB photodiode measures the relative (or absolute) magnitudes of the color components to verify the connection. Alternatively, one end of the connection may transmit white light with the other end reflecting back a similar three-color signal by use of a color-coded panel reflector.

A first aspect of the present invention provides a method for verifying an optical connection. The method includes: generating an optical verification signal, the optical verification signal comprising a plurality of signals having distinct colors, wherein magnitudes of the distinct color signals encode a connection identifier; and transmitting the optical verification signal via a first end of a cord.

A second aspect of the present invention provides a method for verifying an optical connection. The method includes: receiving an optical verification signal via a first end of the cord, the optical verification signal comprising a plurality of signals having distinct colors, wherein magnitudes of the distinct color signals encode a connection identifier; and, based on the received optical verification signal, decoding the connection identifier to verify a connection.

A third aspect of the present invention provides apparatus for verifying an optical connection. The apparatus includes: a light generating block that generates an optical verification signal, the optical verification signal comprising a plurality of signals having distinct colors, wherein magnitudes of the distinct color signals encode a connection identifier; and, a coupler that combines the optical verification signal with a data-carrying optical signal to form a combined signal to inject into a shared fiber.

A fourth aspect of the present invention provides apparatus for verifying an optical connection. The apparatus includes: a light generating block that generates an optical verification signal, the optical verification signal comprising a plurality of signals having distinct colors wherein magnitudes of the distinct color signals encode a connection identifier; and a connector block that directs the optical verification signal into a first fiber of a cord and directs a data-carrying optical signal into a second fiber of the cord.

Further understanding of the nature and advantages of the inventions herein may be realized by reference to the remaining portions of the specification and the attached drawings.

DESCRIPTION OF SPECIFIC EMBODIMENTS

Optical verification connection schemes provided by embodiments of the present invention will be described with reference to a representative application where there is a singe optical connection between front panels of a transmitter card and a multiplexer card. It will of course be appreciated that the present invention will find application in all kinds of optical connection scenarios where there are any number of connections.

Figure 4:
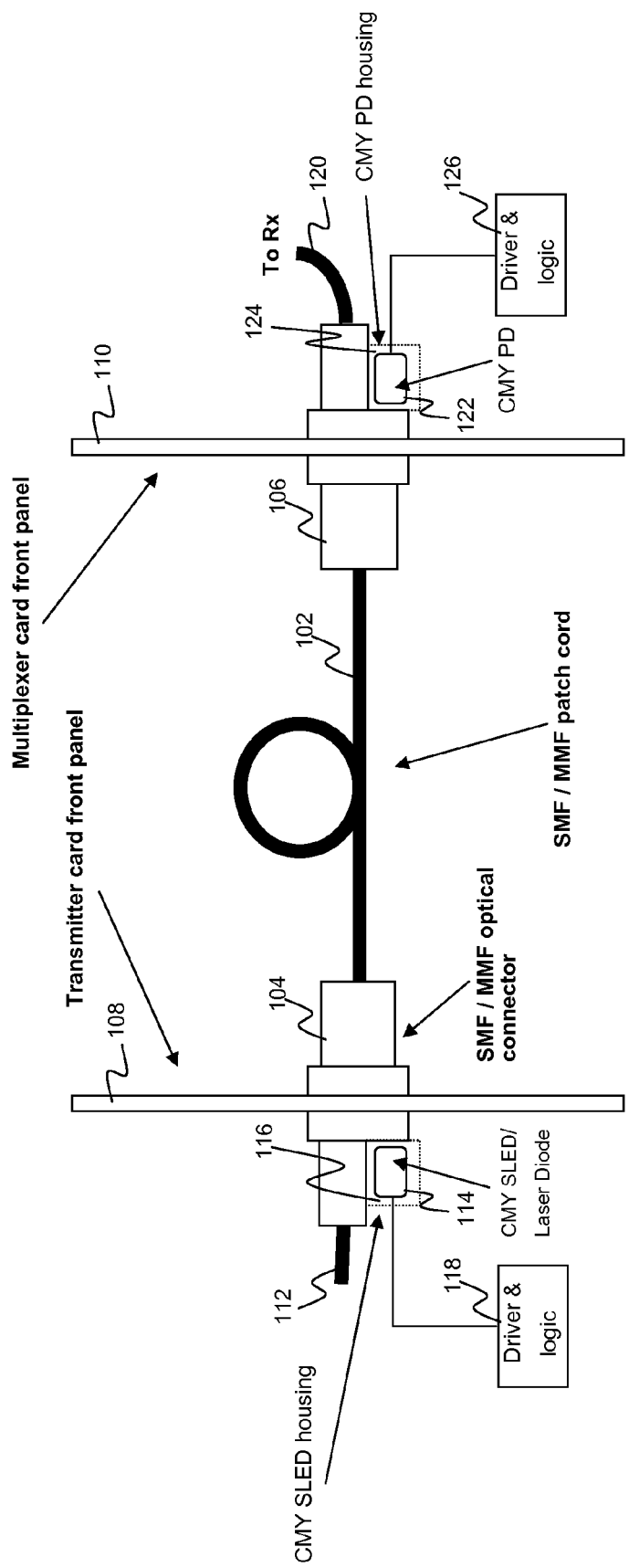
FIG. 4 depicts a similar arrangement as in FIG. 1, except that the SLED/laser diode and photodiode operate with CMY colors.
Figure 5:
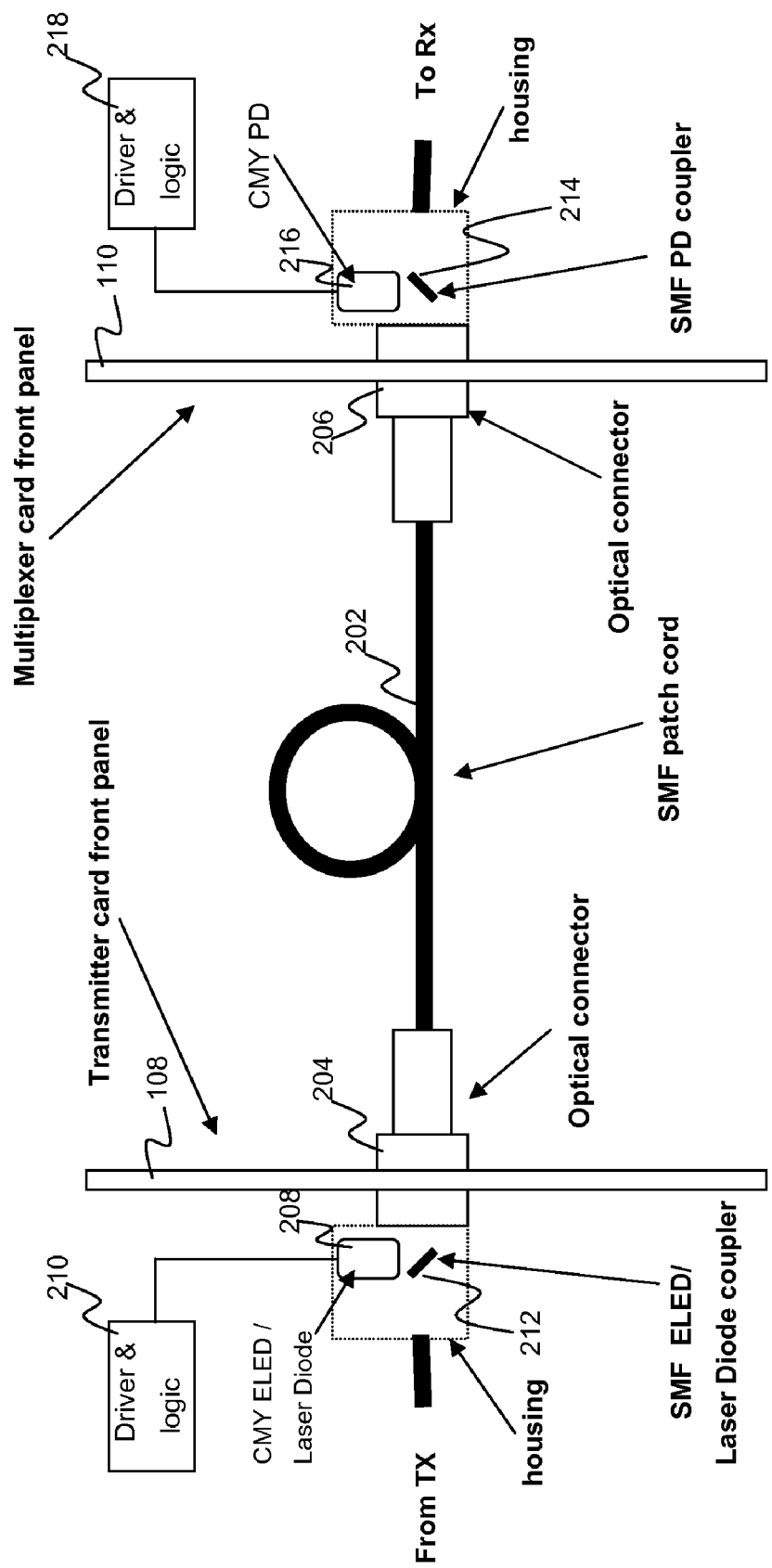
FIG. 5 depicts a similar arrangement as FIG. 2, except that the SLED/laser diode and photodiode operate with CMY colors.
Figure 6:
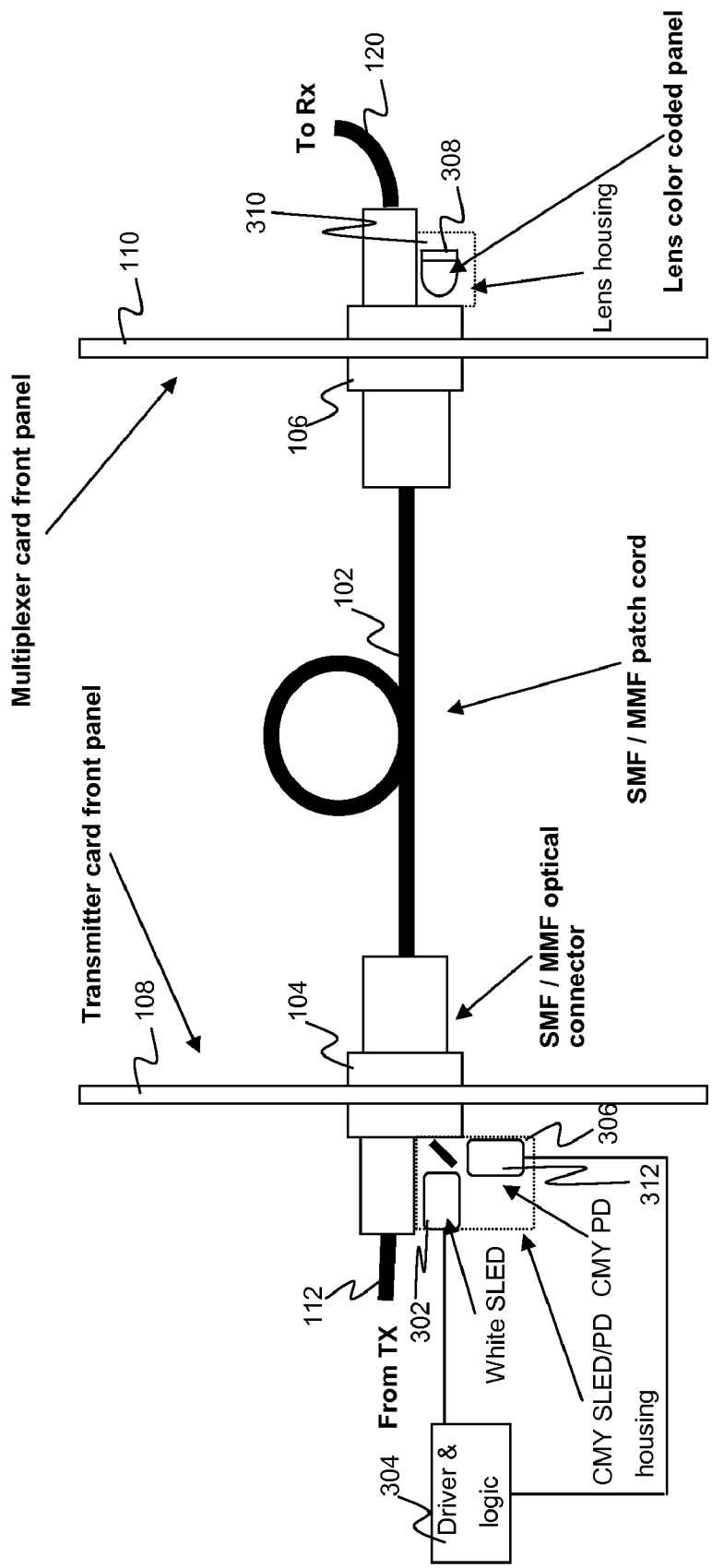
FIG. 6 depicts a similar arrangement as FIG. 3, except that CMY colors are used.

In accordance with embodiments of the present invention, a connection, particular optical connector, or other relevant connection component is specified by a connection identifier. The connection identifier gives relative or absolute magnitudes of color components in a multicolor signal. For example, the connection identifier will give the magnitudes of red, green and blue components in a RGB signal. Alternative color scales may also be used such as, e.g., CMY, illustrated in the schemes of FIGS. 4-6.

By allowing eight possible magnitudes for each of three color components, $8^3$ (512) different connection identifiers could be achieved. Using every possible connection identifier would however require a calibration step as part of the connection verification procedure. This is because not all of the 512 connection identifiers have unique relative color magnitudes. For example, a connection identifier that has RGB magnitudes of (1, 2, 1) would not be distinguishable from a connection identifier (2, 4, 2). If one wishes to forego the need for calibration, connection identifiers with identical ratios among color components should not be allocated. In the representative example that includes 8 possible magnitudes for each of three color components, approximately 17.6% of connection identifiers should be discarded, leaving 422 out of 512 identifiers available.

Figure 1:
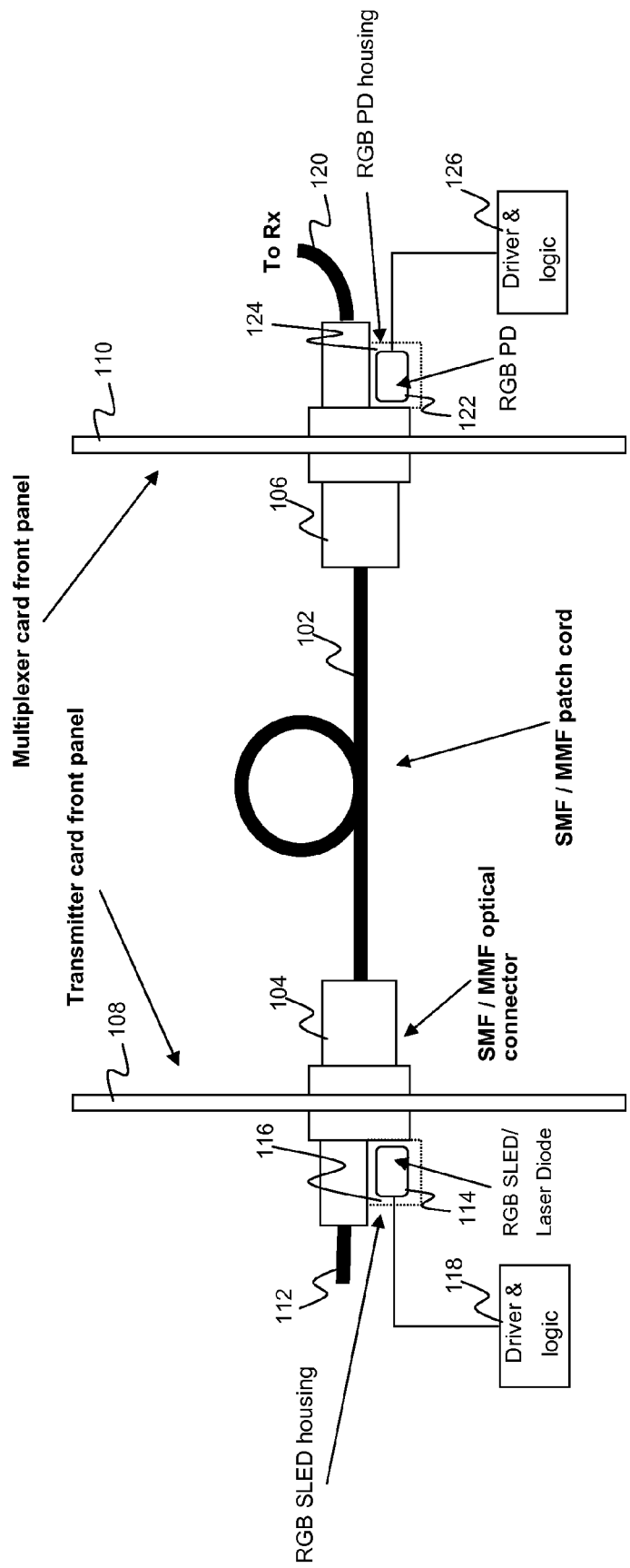
FIG. 1 depicts an optical connection verification scheme where separate optical fibers are included in a patch cord to carry the transmission signal and the verification signal according to one embodiment of the present invention.

FIG. 1 depicts an optical verification scheme where a transmission signal and verification signal travel in different fibers in the same patch cord. A patch cord 102 includes both a single-mode fiber (SMF) and a multi-mode fiber (MMF). The SMF is used to carry the payload optical transmission signal between the transmitter and the multiplexer. The MMF is used to carry the special optical verification signal according to the present invention. These fiber choices are presented by way of example. For example, the verification fiber could also be SMF. Patch cord 102 extends between SMF/MMF optical connectors 104 and 106 which are embedded in transmitter front panel 108 and multiplexer front panel 110 respectively. On the interior side of transmitter panel 108, SMF/MMF optical connector 104 is coupled to an SMF 112 carrying the transmission signal. The MMF of patch cord 102 is coupled to an RGB surface light emitting diode (SLED) or laser diode 114 which sits within an RGB SLED housing 116. Approximately 10% coupling may be achieved between SLED/laser diode 114 and the MMF but this may be improved by use of a lens.

RGB SLED 114 may be, e.g., an SLED available from Fairchild Semiconductor. RGB SLED 114 outputs red, green, and blue light into the MMF of patch cord 102. The intensity of each color component is proportional to a corresponding input drive current provided by a driver and logic block 118. Driver and logic block 118 outputs drive currents in accordance with a configured connection identifier that specifies the magnitudes of each color component. The direction of propagation of the transmission signal via the SMF of patch cord 102 may be either the same or opposite to the propagation direction of the verification signal via the MMF.

On the multiplexer side, the SMF of patch cord 102 is coupled to an internal SMF 120. The MMF of patch cord 102 is coupled to an RGB photodiode set 122 that sits within an RGB photodiode housing 124. RGB photodiode set 122 detects the received red, green, and blue color components and outputs proportional current to a driver and logic block 126. Driver and logic block 126 is configured with the expected connection identifier.

If a scheme that relies on absolute color component values is being used, RGB SLED 114 may alternate between transmitting a calibration signal having three full scale color components and a verification signal where the color components represent the connection identifier value. The driver and logic block 126 will use the calibration signal to establish the full scale values for the, red, green, and blue components and determine the transmitted connection identifier based on the values of the verification signal's color components relative to the previously measured full scale values. This allows compensation for loss variations among different connections. The result is a received connection identifier value which is then compared to an expected value that has been configured. If there is a mismatch, a connection error can be reported by use of e.g., audible alert, indicator light (not shown), etc. Alternatively, or additionally, a visual or audio alert can be used to verify correct connectivity.

If a relative magnitude identifier scheme is being used, RGB SLED 114 can continuously transmit color components having relative magnitudes determined by the connection identifier. Driver and logic block 126 then tests whether the relative received color components values match that of the pre-programmed connection identifier and alerts appropriately if a misconnection is detected.

Figure 2:
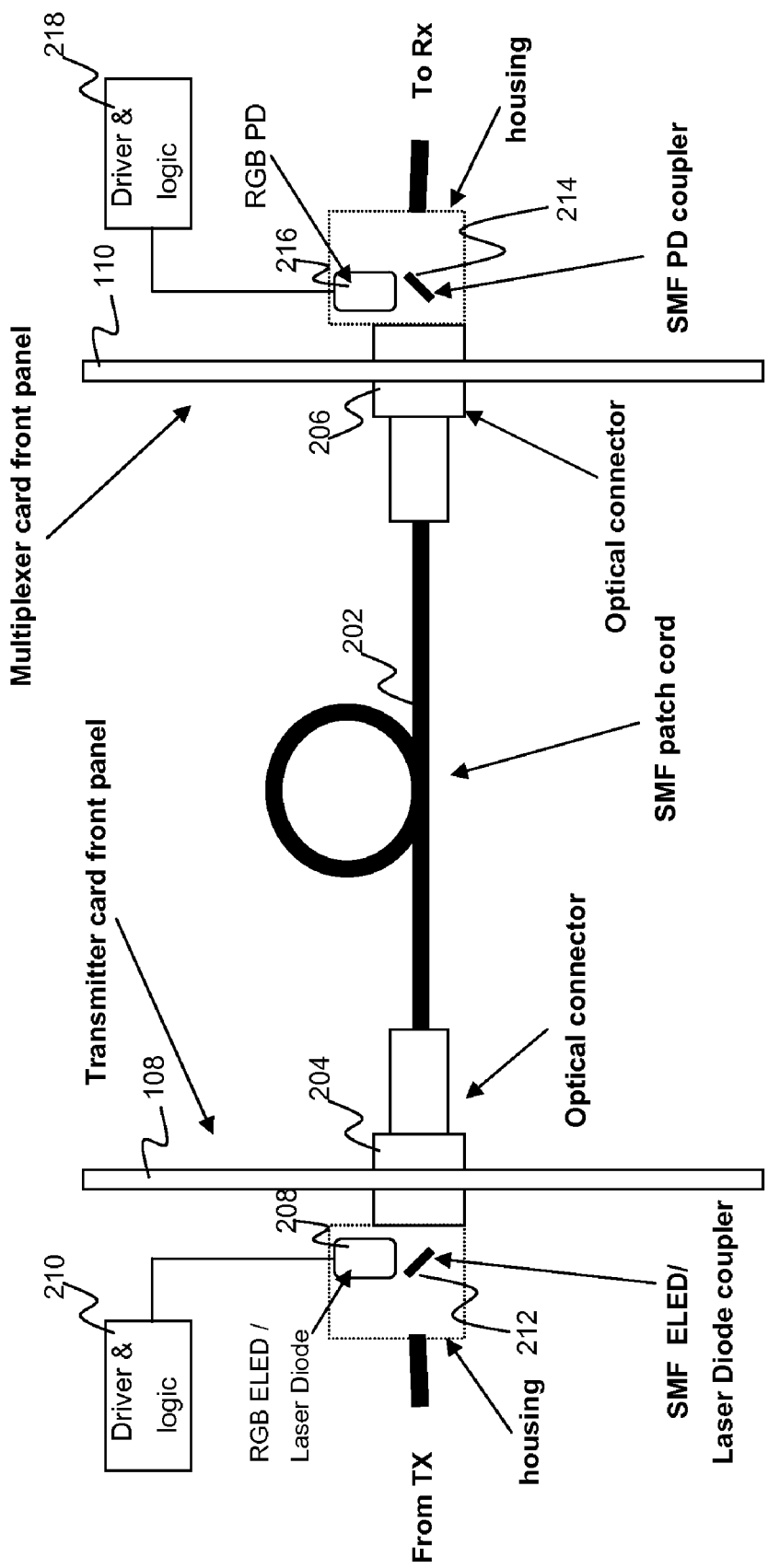
FIG. 2 depicts an optical connection verification scheme wherein the transmission signal and the verification signal share the same fiber according to one embodiment of the present invention.

FIG. 2 depicts an optical connection verification scheme where the verification signal and transmission signal share the same fiber according to one embodiment of the present invention. A patch cord 202 includes a single SMF. Patch cord 202 interconnects optical connectors 204 and 206 which are embedded in transmitter card front panel 108 and multiplexer card front panel 110 respectively. On the transmitter side, the optical verification signal is generated by an RGB edge LED (ELED) or laser diode 208. Similarly to RGB SLED/laser diode 114 of FIG. 1, RGB ELED/laser diode 208 outputs a three-color signal whose color components are determined by three drive currents output by a driver and logic block 210. The operation of driver and logic block 210 is similar to that of driver and logic block 118. A coupler 212 combines the transmission signal with the output of RGB ELED/laser diode 208 for input into patch cord 202. Coupling between ELED/laser diode 208 and the SMF may be approximately 15% but can be improved by use of a lens.

On the multiplexer side, the light received via patch cord 202 is divided by a coupler 214 into two portions. One portion is directed to a RGB photodiode set 216. The other portion is directed to the components that will further process the transmission signal. The coupling loss can be approximately 0.3 dB. RGB photodiode set 216 generates currents proportional to the received color components. The currents are processed by a driver and logic block 218 that verifies correct connectivity in the same way as driver and logic block 126 of FIG. 1.

The arrangement of FIG. 2 provides for use of a less expensive single-fiber patch cord. Any suitable type of fiber may be substituted for the SMF in patch cord 202.

Figure 3:
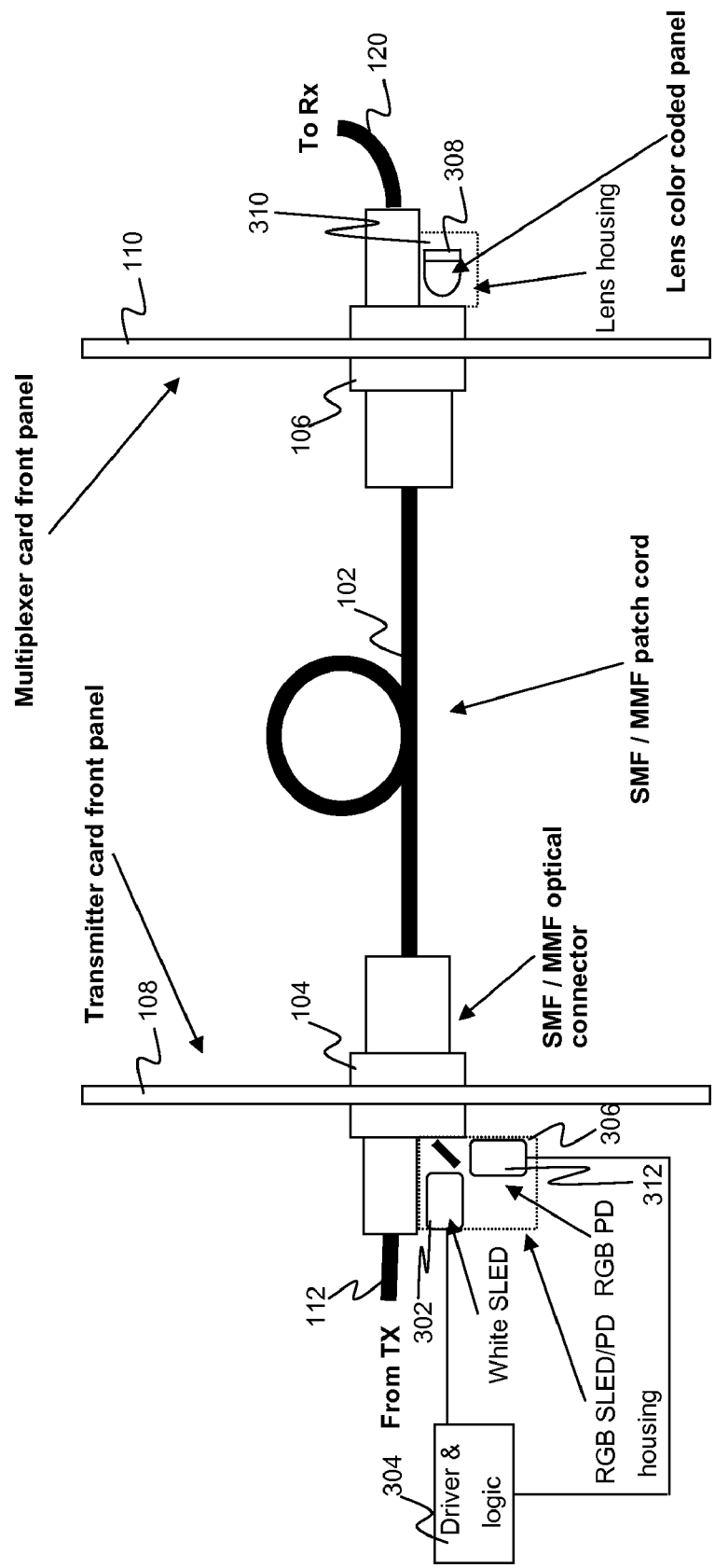
FIG. 3 depicts an optical verification scheme where separate optical fibers are included in a patch cord to carry the transmission signal and the verification signal according to an alternative embodiment of the present invention.

FIG. 3 depicts an alternative optical connection verification scheme using two fibers in the same patch cord according to one embodiment of the present invention. The patch cord and connectors are as in FIG. 1. In FIG. 3, however, the transmitter side sends white light to the receiver side via the MMF within patch cord 102. On the multiplexer side, RGB components of this white light are reflected back in accordance with a pre-configured connection identifier. The returned light has its color components measured at the transmitter side to verify connectivity.

The white light is generated by a white surface LED (SLED) 302 operating under the control of a driver and logic block 304. The white light is coupled into the MMF of patch cord 102 by operation of a coupler within a SLED/photodiode housing 306. At the receiver end, the MMF of patch cord 102 is connected to a lens color coded panel 308 that sits within lens housing 310. Lens color coded panel 308 focuses the received white spectrum light on a mirror via three co-planar dielectric filters, each one corresponding to a particular color component. Each filter blocks partially or completely one primary color, reflecting it back to an extent determined by the connection identifier. The spectral transmission characteristics of the dielectric filters are chosen in accordance with an appropriate connection identifier according to the present invention. In this way the encoded light reflected back from lens color coded panel 308 has the RGB color component values specified by the connection identifier.

At the transmitter side, the reflected RGB signal is coupled to an RGB photodiode set 312. RGB photodiode set 312 outputs currents proportional to the RGB components of the reflected verification signal to driver and logic block 304 which compares the received component values to the pre-programmed expected connection identifier. Driver and logic block 304 can then issue an appropriate audible or visual notification of a misconnection. For the scheme of FIG. 3, it is preferable to use the relative magnitude scheme rather than the absolute magnitude scheme since the RGB values cannot be readily modified to introduce a calibration step.

It will be seen then that an advantageous optical connection verification scheme is provided by embodiments of the present invention. The scheme is based on the use of standard inexpensive optical components. There are no electromagnetic compatibility issues. A large number of unique connection identifiers can be specified.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, any appropriate light generation or detection scheme can be used for generation and detection of the color components. More particularly, a laser diode device may substitute for the described LEDs. Any suitable optical fiber may be used instead of the fiber types listed above.

The invention claimed is:

1. A method for verifying an optical connection, said method comprising:
   generating an optical verification signal, said optical verification signal comprising a plurality of signals having distinct colors, wherein magnitudes of said distinct color signals encode a connection identifier;
   transmitting said optical verification signal via a first end of a cord;
   receiving said optical verification signal via a second end of said cord; and
   based on said received optical verification signal, decoding said connection identifier to verify a connection.

2. The method of claim 1 further comprising:
   transmitting a data-carrying optical signal into said first end of said cord; and
   receiving said data-carrying optical signal via said second end of said cord.

3. The method of claim 2 further comprising combining said data-carrying optical signal and said optical verification signal for transmission into a common fiber within said cord.

4. The method of claim 2 wherein said data-carrying optical signal and said optical verification signal are transmitted via distinct fibers within said cord.

5. The method of claim 1 wherein said optical verification signal comprises an RGB signal.

6. The method of claim 1 wherein said optical verification signal comprises a CMY signal.

7. A method for verifying an optical connection, said method comprising:
   receiving an optical verification signal via a first end of a cord, said optical verification signal comprising a plurality of signals having distinct colors, wherein magnitudes of said distinct color signals encode a connection identifier; and
   based on said received optical verification signal, decoding said connection identifier to verify a connection.

8. The method of claim 7 further comprising:
   receiving a data-carrying optical signal via a first end of a cord.

9. The method of claim 8 wherein said data-carrying optical signal and said optical verification signal are received via a common fiber of said cord.

10. The method of claim 8 wherein said data-carrying optical signal and said optical verification signal are received via distinct fibers of said cord.

11. The method of claim 7 further comprising:
    transmitting white light via said first end of said cord; and
    wherein said optical verification signal comprises components of said white light that have been reflected from a second end of said cord.

12. An optical connection transmission apparatus comprising:
    a light generating block that generates an optical verification signal, said optical verification signal comprising a plurality of signals having distinct colors, wherein magnitudes of said distinct color signals encode a connection identifier, and that includes a driver that generates electrical signals indicative of desired transmitted magnitudes of said distinct color signals; and
    a coupler that combines said optical verification signal with a data-carrying optical signal to form a combined signal to inject into a shared optical fiber for allowing connection verification upon reception of said optical verification signal.

13. The apparatus of claim 12 wherein said light generating block further comprises:
    an LED device that generates said plurality of signals in response to said electrical signals.

14. The apparatus of claim 13 wherein said LED device comprises an edge LED device.

15. The apparatus of claim 12 wherein said light generating block further comprises a laser diode device.

16. An optical connection apparatus comprising:
    a light generating block that generates an optical verification signal, said optical verification signal comprising a plurality of signals having distinct colors wherein magnitudes of said distinct color signals encode a connection identifier, and that includes a driver that generates electrical signals indicative of desired transmitted magnitudes of said distinct color signals; and
    a connector block that directs said optical verification signal into a first optical fiber of a cord and directs a data-carrying optical signal into a second optical fiber of said cord, said optical verification signal upon reception allowing connection verification.

17. The apparatus of claim 16 wherein said light generating block further comprising:
    an LED device that generates said plurality of signals in response to said electrical signals.

18. The apparatus of claim 17 wherein said LED device comprises a surface LED device.

19. The apparatus of claim 16 wherein said light generating block further comprises a laser diode device.

20. The apparatus of claim 16 further comprising:
    a light detection block that receives said optical verification signal via a second end of said cord; and a decoder block that, based on said received optical verification signal, decodes said connection identifier to verify a connection.

21. Apparatus for verifying an optical signal, said apparatus comprising:
- a light detection block that receives an optical verification signal via a first end of a cord, said optical verification signal comprising a plurality of signals having distinct colors wherein magnitudes of said distinct color signals encode a connection identifier; and
- a decoder block that, based on said received optical verification signal, decodes a connection identifier to verify a connection.

22. The apparatus of claim 21 further comprising:
a white light generation block that generates white light to be transmitted via said first end of said cord; and
wherein said optical verification signal comprises components of said white light that have been reflected from a second end of said cord.

23. The apparatus of claim 21 further comprising:
a splitter that separates said optical verification signal from a data-carrying optical signal that shares a common fiber within said cord with said optical verification signal.

24. The apparatus of claim 21 wherein said optical verification signal is received via a first fiber of said cord and a data-carrying optical signal travels via a second fiber of said cord.

25. Apparatus for verifying an optical connection, said apparatus comprising:
- means for generating an optical verification signal, said optical verification signal comprising a plurality of signals having distinct colors, wherein magnitudes of said distinct color signals encode a connection identifier;
- means for transmitting said optical verification signal via a first end of a cord;
- means for receiving an optical verification signal via a first end of a cord, said optical verification signal comprising a plurality of signals having distinct colors, wherein magnitudes of said distinct color signals encode a connection identifier; and
- means for, based on said received optical verification signal, decoding said connection identifier to verify a connection.

* * * * *